(12) United States Patent
Hill et al.

(10) Patent No.: US 10,464,607 B1
(45) Date of Patent: Nov. 5, 2019

(54) TRUCK BED TRAILER

(71) Applicant: Classic Truck Trailer, LLC, Oklahoma City, OK (US)

(72) Inventors: David Kimmel Hill, Oklahoma City, OK (US); Mark Edward Sharp, Oklahoma City, OK (US)

(73) Assignee: CLASSIC TRUCK TRAILER, LLC, Oklahoma City, OK (US)

( * ) Notice: Subject to any disclaimer, the term of this patent is extended or adjusted under 35 U.S.C. 154(b) by 0 days.

(21) Appl. No.: 15/714,865

(22) Filed: Sep. 25, 2017

Related U.S. Application Data

(60) Provisional application No. 62/398,870, filed on Sep. 23, 2016.

(51) Int. Cl.
| | |
|---|---|
| *B62D 21/02* | (2006.01) |
| *B62D 63/06* | (2006.01) |
| *B62D 33/03* | (2006.01) |
| *B62D 21/11* | (2006.01) |
| *B62D 21/20* | (2006.01) |

(52) U.S. Cl.
CPC ............. *B62D 21/02* (2013.01); *B62D 21/11* (2013.01); *B62D 21/20* (2013.01); *B62D 33/03* (2013.01); *B62D 63/062* (2013.01)

(58) Field of Classification Search
CPC ........ B62D 21/02; B62D 21/11; B62D 21/20; B62D 63/062; B62D 33/03
See application file for complete search history.

(56) References Cited

U.S. PATENT DOCUMENTS

| | | | | |
|---|---|---|---|---|
| 169,569 | A | 11/1875 | Neal | |
| 2,150,066 | A * | 3/1939 | Kalb | B60D 1/167 280/495 |
| 2,303,827 | A * | 12/1942 | Deese | B62D 63/062 267/262 |
| 2,332,326 | A * | 10/1943 | Lex | B62D 63/062 280/149.2 |
| 3,266,836 | A * | 8/1966 | Taylor | B60P 3/105 280/414.1 |
| 3,282,603 | A * | 11/1966 | Barth | B62D 25/2054 280/789 |
| 3,797,850 | A | 3/1974 | Stout | |
| 4,168,093 | A * | 9/1979 | Dysthe | B62D 63/064 280/400 |
| 4,261,594 | A * | 4/1981 | Corbett | B60D 1/07 280/417.1 |
| 4,372,568 | A * | 2/1983 | Campbell | B62D 63/064 280/204 |
| D274,507 | S * | 7/1984 | Wilson | D12/105 |

(Continued)

OTHER PUBLICATIONS

Pics of truck bed trailers, available at http://www.pirate4x4.com/forum/tow-rigs-trailers/962352-pics-truck-bed-trailers.html (last accessed Sep. 25, 2017).

(Continued)

*Primary Examiner* — Laura Freedman
(74) *Attorney, Agent, or Firm* — Shane V. Cortesi

(57) ABSTRACT

A truck bed trailer that includes a truck bed and a trailer frame is described. The trailer frame includes one or more wheels and may be designed to have approximately 60% of the truck bed floor in front of the wheel axles and 40% of the truck bed floor to the rear of the wheel axles.

13 Claims, 6 Drawing Sheets

(56) References Cited

U.S. PATENT DOCUMENTS

| | | | | |
|---|---|---|---|---|
| 4,457,546 | A * | 7/1984 | Wiant | B62D 63/062 280/47.12 |
| 5,161,814 | A * | 11/1992 | Walker | B60G 11/225 280/414.1 |
| D352,722 | S * | 11/1994 | Mandell | D12/105 |
| 5,513,868 | A * | 5/1996 | Barr | B62D 63/062 280/400 |
| 5,544,944 | A * | 8/1996 | Keech | B60P 1/24 280/482 |
| 5,630,693 | A * | 5/1997 | Sobina | B60G 3/14 414/495 |
| 5,653,494 | A * | 8/1997 | Cleall | B60P 3/34 280/19.1 |
| 6,692,014 | B1 * | 2/2004 | Grosso | B60G 7/02 280/124.166 |
| 6,923,475 | B1 * | 8/2005 | Martin | B60D 1/143 280/490.1 |
| 7,380,873 | B2 * | 6/2008 | Shoemaker | B60J 5/108 296/146.11 |
| 8,235,421 | B2 | 8/2012 | Biscan | |
| D695,647 | S | 12/2013 | Manley | |
| 9,327,632 | B1 * | 5/2016 | Bartel | B60P 1/34 |
| 9,499,087 | B2 * | 11/2016 | Freitag | B60P 3/228 |
| 2007/0210614 | A1 * | 9/2007 | Chandler | B62D 33/033 296/182.1 |
| 2008/0150317 | A1 * | 6/2008 | Kilcrease | B62D 63/062 296/100.06 |

OTHER PUBLICATIONS

1979 Ford F-150 truck bed as trailer, available at http://www.classiccarstodayonline.com/classic-car-print-advertisements/truck-bed-as-trailer/ (last accessed Sep. 25, 2017).

Matt's Toyota Truck Bed Trailer, available at http://forum.ih8mud.com/threads/matts-toyota-truck-bed-trailer.636350/page-3 (last accessed Sep. 25, 2017).

* cited by examiner

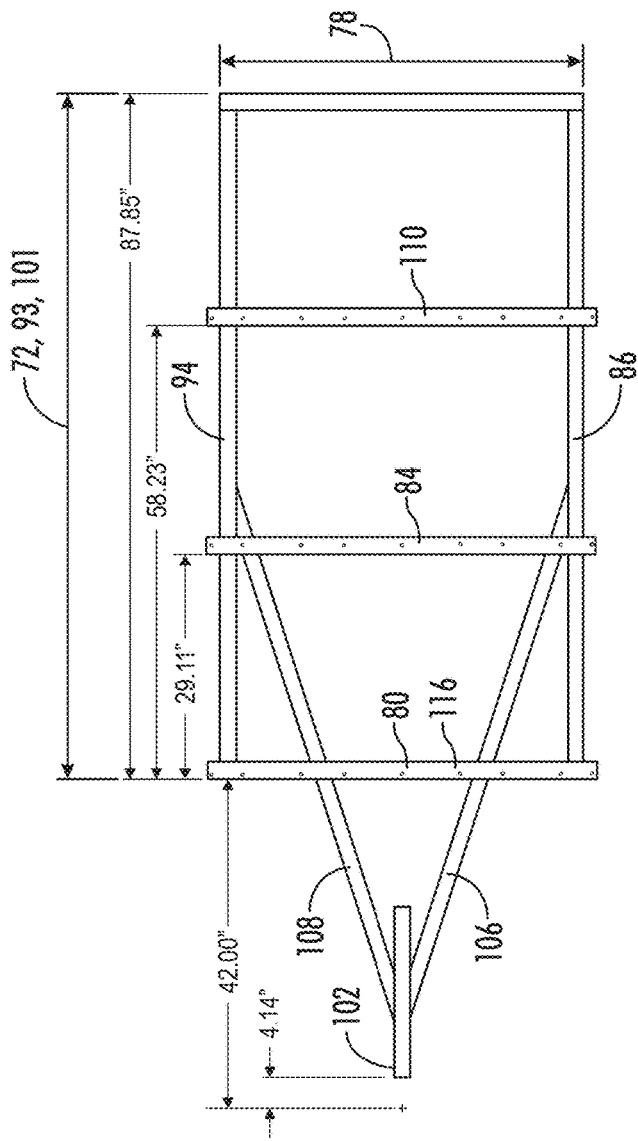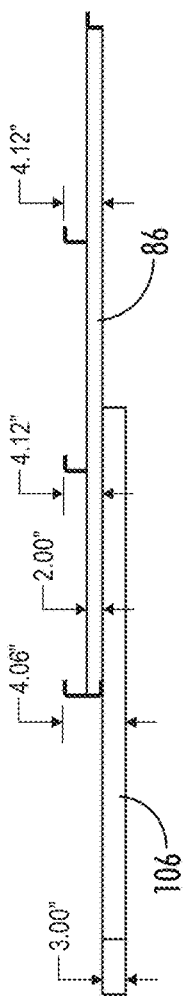
FIG. 2A
FIG. 2B

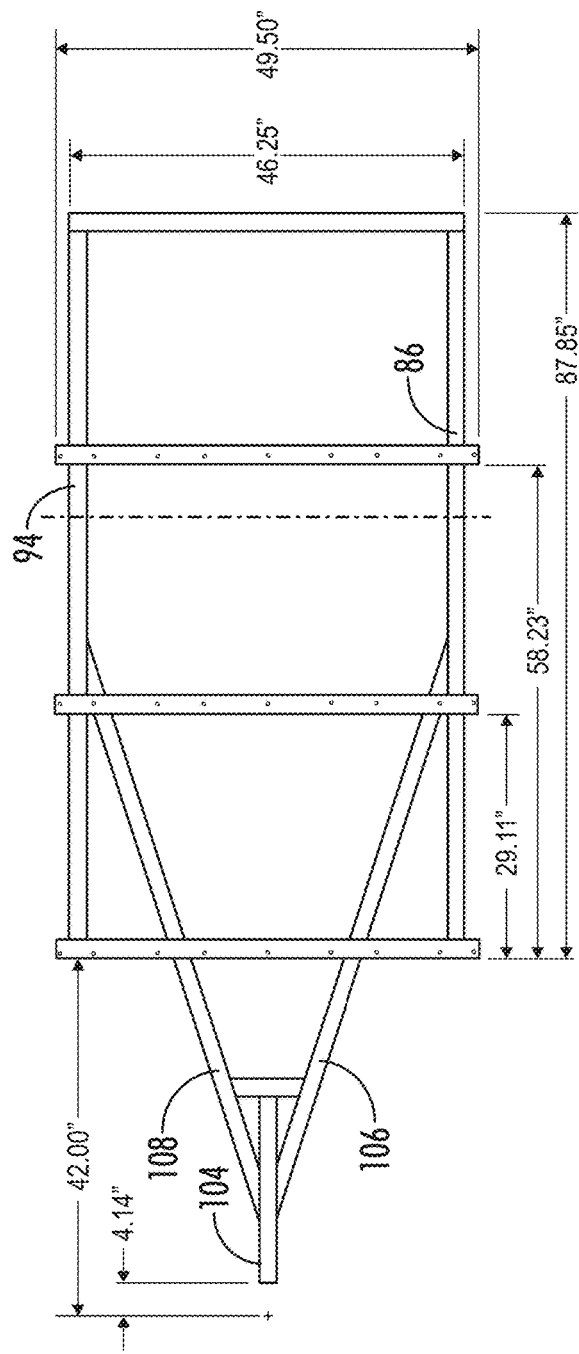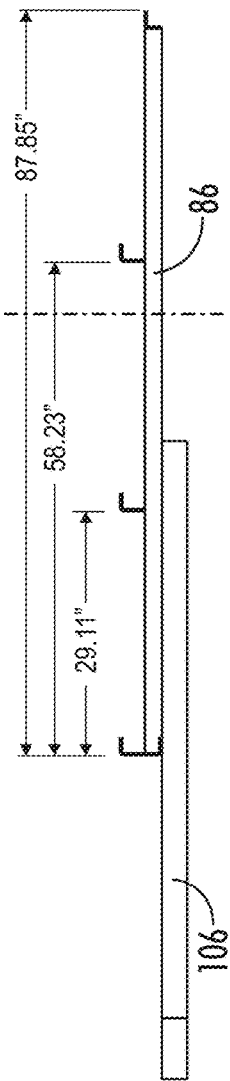

TRUCK BED TRAILER

RELATED APPLICATIONS

The present application claims priority under 35 USC 119 to U.S. Provisional Application No. 62/398,870, the contents of which are incorporated herein by reference in their entirety.

BACKGROUND

Technical Field

The present invention relates to vehicle trailers. Examples of trailers are described in, for example, U.S. Design Pat. No. D695,647 and U.S. Pat. No. 8,235,421. However, there is a need for new trailers, especially those that are designed to resemble the appearance of a truck bed.

Background of the Invention

Vehicle trailers are well known in the art and typically include a frame, a hitch and a plurality of wheels.

BRIEF SUMMARY

The present disclosure provides a vehicle trailer as described herein.

In some embodiments, the present disclosure provides a truck bed trailer comprising: a trailer frame comprising a trailer frame front end, a trailer frame rear end, a trailer frame length extending from the trailer frame front end to the trailer frame rear end, a trailer coupler configured to attach to a hitch of a vehicle and located adjacent to the trailer frame front end, a trailer frame left side comprising a left wheel comprising a left wheel axle, a trailer frame right side comprising a right wheel comprising a right wheel axle, and a trailer frame width extending from the trailer frame left side to the trailer frame right side and generally perpendicular to the trailer frame length; a truck bed comprising a truck bed front, a truck bed rear, a truck bed left side, a truck bed right side, a truck bed floor attached to the trailer frame, the truck bed floor comprising a truck bed floor surface area, a truck bed open top opposite the truck bed floor, a truck bed front wall extending from the floor and forming the truck bed front, a truck bed left sidewall generally perpendicular to the truck bed front wall and extending upwardly from the truck bed floor, the truck bed left sidewall forming the truck bed left side and comprising a left wheel well receiving the left wheel, a truck bed right sidewall generally perpendicular to the truck bed front wall, extending upwardly from the truck bed floor and opposite the truck bed left sidewall, the truck bed right sidewall forming the truck bed right side and comprising a right wheel well receiving the right wheel, and a truck bed rear wall opposite the truck bed front wall and forming the truck bed rear, the truck bed floor, the truck bed front wall, the truck bed rear wall, and the truck bed left and right sidewalls defining a truck bed chamber configured to transport cargo, wherein about 60% of the surface area of the truck bed floor is located in front of the right axle and in front of the left axle and further wherein about 40% of the surface area of the truck bed floor is located to the rear of the right axle and to the rear of the left axle. Optionally, approximately 60% of the truck bed length is located in front of the right axle and in front of the left axle and further wherein approximately 40% of the truck bed length is located to the rear of the right axle and to the rear of the left axle. The aforementioned percentage distributions may vary by, for example, by less than 10%, more preferably less than 5%, even more preferably less than 3%, even more preferably less than 2%. To illustrate this point, and using the deviation of 10%, when it is said that about 60% of the surface area of the truck bed floor is located in front of the right axle and in front of the left axle and further wherein about 40% of the surface area of the truck bed floor is located to the rear of the right axle and to the rear of the left axle, in an embodiment 50%-70% (i.e., 60%+/−10%) of the surface area of the truck bed floor is located in front of the right axle and in front of the left axle and 50-30% (i.e., 40%+/−10%) of the surface area of the truck bed floor is located to the rear of the right axle and to the rear of the left axle.

Optionally, the truck bed floor is bolted to the trailer frame by placing bolts through the truck bed floor and through holes located in the trailer frame. Optionally, the truck bed rear wall is in the form of a tailgate configured to pivot along an axis generally parallel to the rear wall. Optionally, the truck bed lacks a gas cap. Optionally, the truck bed trailer further comprises electric brakes coupled to the left wheel and the right wheel. Optionally, the left wheel and the right wheel are configured to support at least 2,200 pounds.

Optionally, the trailer frame comprises: a truck bed support located below the truck bed floor and generally rectangular in shape and comprising a truck bed support front, a truck bed support rear, a truck bed support length extending from the truck bed support front to the truck bed support rear and generally parallel to the truck bed length, a truck bed support left side, a truck bed support right side, a truck bed support width extending from the truck bed support left side to the truck bed support right side and generally parallel to the truck bed width, a truck bed support front bar forming the truck bed support front and generally parallel to the truck bed width, a truck bed support rear bar forming the truck bed support rear and generally parallel to the truck bed width, a truck bed support first middle bar located between the truck bed support front bar and the truck bed support rear bar and extending generally parallel to the truck bed width, a truck bed support left side bar forming the truck bed support left side and comprising a truck bed support left side bar front end attached to the truck bed support front bar, a truck bed support left side bar middle portion attached to the truck bed support first middle bar, and a truck bed support left side bar length extending from the truck bed support left side bar front end to the truck bed support left side bar rear end and generally parallel to the truck bed support length, and a truck bed support right side bar forming the truck bed support right side and comprising a truck bed support right side bar front end attached to the truck bed support front bar, a middle portion attached to the truck bed support first middle bar, a truck bed support rear end attached to the truck bed support rear bar and a truck bed support right side bar length extending from the truck bed support right side bar front end to the truck bed support right side bar rear end and generally parallel to the truck bed support length; and a tongue frame comprising a tongue frame front bar comprising the trailer coupler, a tongue frame left bar extending at a non-perpendicular angle from the tongue frame front bar, the tongue frame left bar extending below and attaching to the truck bed support front bar and extending below and attached to the truck bed support first middle bar and the truck bed support left side bar, a tongue frame right bar extending at a non-perpendicular angle from the tongue frame front bar, the tongue frame right bar extending below and attaching to the truck bed support front bar and extending below and attached to the truck bed support right side bar.

Optionally, the truck bed floor is bolted to the truck bed support. Optionally, the tongue frame right bar, the tongue frame left bar, and the truck bed support first middle bar form a triangle. Optionally, the angle at which the tongue frame left bar extends from the tongue frame front bar is approximately equal to the angle at which the tongue frame right bar extends from the tongue frame front bar and further wherein the triangle is an isometric triangle. Optionally, the truck bed support further comprises a truck bed support second middle bar located extending between the truck bed support left side bar and the truck bed support right side bar generally parallel to the truck bed width. Optionally, the tongue frame front bar extends towards but does not contact the truck bed support front bar. Optionally, the truck bed comprises at least one runner extending along the truck bed length.

The present disclosure also provides a method of manufacturing a truck bed trailer comprising the steps of:

a) providing a truck bed from an original equipment manufacturer, the truck bed having a truck bed floor; and b) fastening the truck bed to a custom trailer frame having a left axle and a right axle.

The truck bed and the custom trailer frame may include one or more features described above. For example, after step b), about 60% of the surface area of the truck bed floor is located in front of the right axle and in front of the left axle and further wherein about 40% of the surface area of the truck bed floor is located to the rear of the right axle and to the rear of the left axle.

BRIEF DESCRIPTION OF THE DRAWINGS

FIG. 2A illustrates a top plan view of the trailer frame of FIG. 1.

FIG. 2B illustrates a left side elevation view of the trailer frame of FIG. 1.

FIG. 3 illustrates a top plan view of a trailer frame of another embodiment of the present invention.

FIG. 4 illustrates a left side elevation view of the trailer frame of FIG. 3.

DETAILED DESCRIPTION

Figure 1:
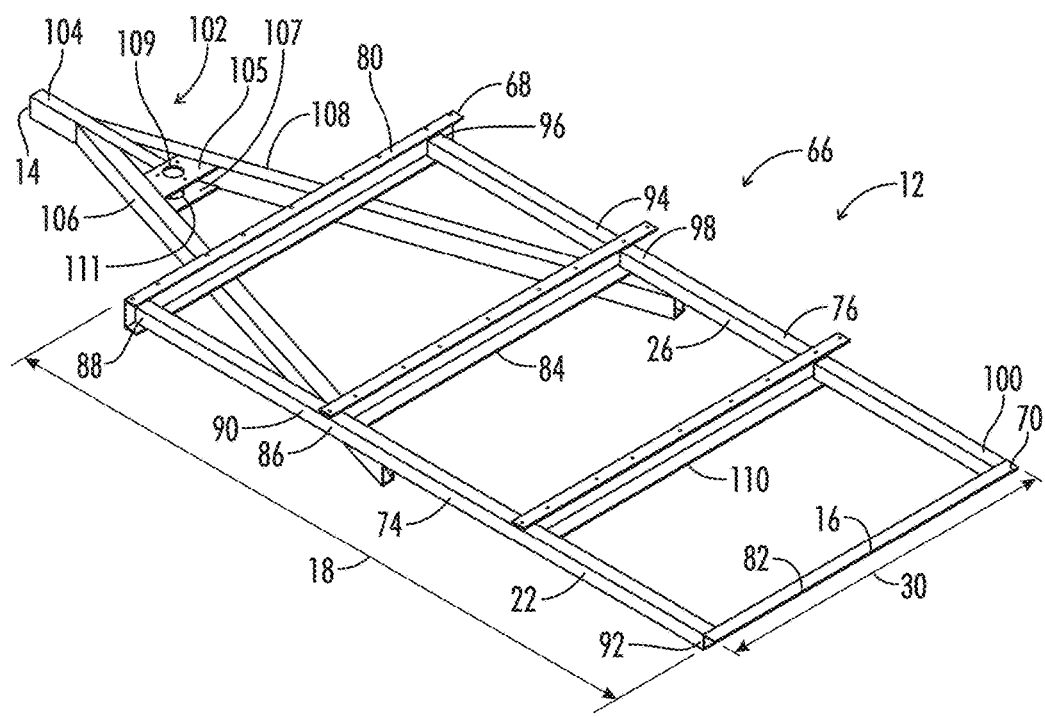
FIG. 1 illustrates a top perspective view of a trailer frame of one embodiment of the present invention.
Figure 5:
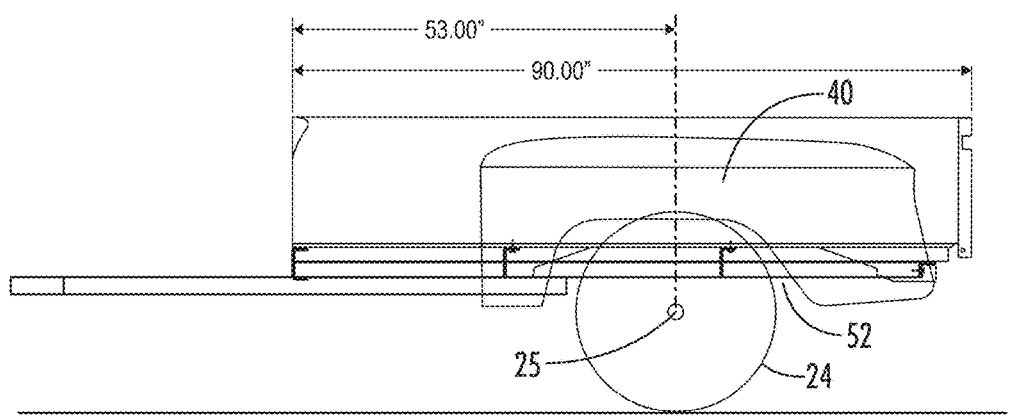
FIG. 5 illustrates a left side elevation view of a truck bed trailer of one embodiment of the present invention.
Figure 6:
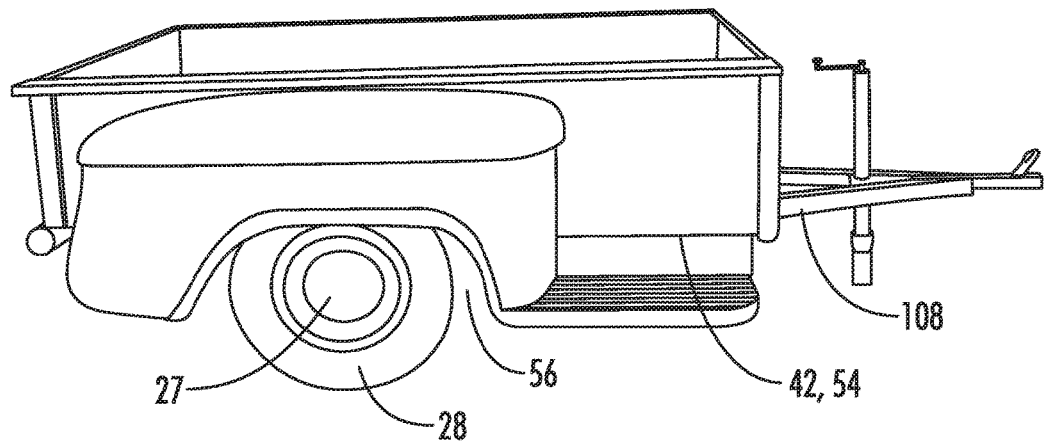
FIG. 6 illustrates a right side perspective view of a truck bed trailer of another embodiment of the present invention.

With reference to FIGS. 1-8, the present invention provides a truck bed trailer designated by the numeral 10. In the drawings, not all reference numbers are included in each drawing for the sake of clarity. The drawings in FIGS. 1-8 are engineering drawings, drawn to scale. However, it will be understood that other proportions of the components are possible. It will also be understood that the dimensions in the drawings are exemplary.

Referring further to FIGS. 1-8, the truck bed trailer 10 may include: a trailer frame 12 comprising a trailer frame front end 14, a trailer frame rear end 16, a trailer frame length 18 extending from the trailer frame front end 14 to the trailer frame rear end 16, a trailer coupler 20 configured to attach to a hitch of a vehicle and located adjacent to the trailer frame front end 14, a trailer frame left side 22 comprising a left wheel 24 comprising a left wheel axle 25, a trailer frame right side 26 comprising a right wheel 28 comprising a right wheel axle 27, and a trailer frame width 30 extending from the trailer frame left side 22 to the trailer frame right side 26 and generally perpendicular to the trailer frame length 18, the trailer frame 12 comprising a weight. The truck bed trailer 10 may further include a truck bed 34 comprising a truck bed front 36, a truck bed rear 38, a truck bed left side 40, a truck bed right side 42, a truck bed floor 44 attached to the trailer frame 12, a truck bed open top 46 opposite the truck bed floor 44, a truck bed front wall 48 extending from the floor 44 and forming the truck bed front 36, a truck bed left sidewall 50 generally perpendicular to the truck bed front wall 48 and extending upwardly from the truck bed floor 44, the truck bed left sidewall 50 forming the truck bed left side 40 and comprising a left wheel well 52 receiving the left wheel 24, a truck bed right sidewall 54 generally perpendicular to the truck bed front wall 48, extending upwardly from the truck bed floor 44 and opposite the truck bed left sidewall 50, the truck bed right sidewall 54 forming the truck bed right side 42 and comprising a right wheel well 56 receiving the right wheel 28, and a truck bed rear wall 58 opposite the truck bed front wall 48 and forming the truck bed rear 38, the truck bed floor 44, the truck bed front wall 48, the truck bed rear wall 58, and the truck bed left and right sidewalls 50 and 54 defining a truck bed chamber 60 configured to transport cargo. In some embodiments, about 60% of the surface area of the truck bed floor 44 is located in front of the right axle 27 and the left axle 25 and about 40% of the surface area of the truck bed floor 44 is located to the rear of the right axle 27 and the left axle 25. Relatedly, approximately 60% of the truck bed length 51 may be located in front of the right axle 27 and the left axle 25 and approximately 40% of the truck bed length 51 may be located to the rear of the right axle 27 and the left axle 25. In addition, about 60% of the truck bed 34 volume may be located in front of the right axle 27 and the left axle 25 and about 40% of the truck bed 34 volume may be located to the rear of the right axle 27 and the left axle 25. As mentioned in the summary, the distributions may vary by, for example, by +/−10%, more preferably less than +/−5%, even more preferably +/−3%, even more preferably less than +/−2%.

Optionally, the truck bed floor 44 is bolted to the trailer frame 12 by placing bolts through the truck bed floor 44 and through holes 116 in the trailer frame 12.

Optionally, the trailer frame 12 is welded together, as noted in the dimensions of the weld bead provided in FIG. 1. Optionally, the truck bed rear wall 58 is in the form of a tailgate configured to pivot along an axis generally parallel to the rear wall.

Optionally, the trailer frame 12 comprises a truck bed support 66 located below the truck bed floor 44 and generally rectangular in shape and comprising a truck bed support front 68, a truck bed support rear 70, a truck bed support length 72 extending from the truck bed support front 68 to the truck bed support rear 70 and generally parallel to the truck bed length 51 (which extends from the truck bed front 36 to the truck bed rear 38), a truck bed support left side 74, a truck bed support right side 76, a truck bed support width 78 extending from the truck bed support left side 74 to the truck bed support right side 76 and generally parallel to the truck bed width 53 (which extends from the truck bed left side 40 to the truck bed right side 42), a truck bed support front bar 80 forming the truck bed support front 68 and generally parallel to the truck bed width 53, a truck bed support rear bar 82 forming the truck bed support rear 70 and generally parallel to the truck bed width 53, a truck bed support first middle bar 84 located between the truck bed support front bar 80 and the truck bed support rear bar 82 and extending generally parallel to the truck bed width 53, a truck bed support left side bar 86 forming the truck bed support left side 74 and comprising a truck bed support left side bar front end 88 attached to the truck bed support front bar 80, a truck bed support left side bar middle portion 90 attached to the truck bed support first middle bar 84, and a truck bed support left side bar length 93 extending from the truck bed support left side bar front end 88 to the truck bed support left side bar rear end 92 and generally parallel to the truck bed support length 72, and a truck bed support right side bar 94 forming the truck bed support right side 76 and comprising a truck bed support right side bar front end 96 attached to the truck bed support front bar 80, a middle portion 98 attached to the truck bed support first middle bar 84, a truck bed support rear end 100 attached to the truck bed support rear bar 82 and a truck bed support right side bar length 101 extending from the truck bed support right side bar front end 96 to the truck bed support right side bar rear end 100 and generally parallel to the truck bed support length 72. Optionally, the trailer frame 12 further includes a tongue frame 102 comprising a tongue frame front bar 104 comprising the trailer coupler 22, a tongue frame left bar 106 extending at a non-perpendicular angle from the tongue frame front bar 104, the tongue frame left bar 106 extending below and attaching to the truck bed support front bar 80 and extending below and attached to the truck bed support first middle bar 84 and the truck bed support left side bar 86, a tongue frame right bar 108 extending at a non-perpendicular angle from the tongue frame front bar 104, the tongue frame right bar 108 extending below and attaching to the truck bed support front bar 80 and extending below and attached to the truck bed support right side bar 94.

Optionally, the truck bed floor 44 is bolted to the truck bed support 66. Optionally, the tongue frame right bar 108, the tongue frame left bar 106, and the truck bed support first middle bar 84 form a triangle. Optionally, the angle at which the tongue frame left bar 106 extends from the tongue frame front bar 104 is approximately equal to the angle at which the tongue frame right bar 108 extends from the tongue frame front bar 104 and further wherein the triangle is an isometric triangle. Optionally, the truck bed support 66 further comprises a truck bed support second middle bar 110 located extending between the truck bed support left side bar 86 and the truck bed support right side bar 94 generally parallel to the truck bed width 53. Optionally, the tongue frame front bar 104 extends towards but does not contact the truck bed support front bar 80. For example, the tongue frame front bar 104 may terminate into a top horizontal bar 105 that includes a top horizontal bar hole 109 and a bottom horizontal bar 107 with a bottom horizontal bar hole 111 located directly below the top horizontal bar 105. The purpose of the holes 109 and 111 is to mount to a front trailer jack with swivel wheel assembly. The trailer jack's function is to allow for easy movement, alignment and proper connection to the vehicle on installation. When the truck bed trailer 10 is not connected to the vehicle, the trailer jack with swivel wheel is used to protect and keep the tongue frame 102 off the ground, level and balance the truck bed trailer 10 and allow for easy movement of the truck bed trailer 10.

Optionally, the truck bed 34 comprises at least one runner 112 extending along the truck bed length 51.

Optionally, the left wheel 24 and the right wheel 28 combined are configured to support at least 2,200 pounds.

Optionally, the truck bed trailer 10 complies with Department of Transportation requirements with respect to, for example, signals, brakes, side lighting, and the like.

| Part List | |
|---|---|
| truck bed trailer | 10 |
| trailer frame | 12 |
| trailer frame front end | 14 |
| trailer frame rear end | 16 |
| trailer frame length | 18 |
| trailer coupler | 20 |
| trailer frame left side | 22 |
| left wheel | 24 |
| Left wheel axle | 25 |
| trailer frame right side | 26 |
| Right wheel axle | 27 |
| right wheel | 28 |
| trailer frame width | 30 |
| truck bed | 34 |
| truck bed front | 36 |
| truck bed rear | 38 |
| truck bed left side | 40 |
| truck bed right side | 42 |
| truck bed floor | 44 |
| truck bed open top | 46 |
| truck bed front wall | 48 |
| truck bed left sidewall | 50 |
| truck bed length | 51 |
| left wheel well | 52 |
| truck bed right sidewall | 54 |
| right wheel well | 56 |
| truck bed rear wall | 58 |
| truck bed chamber | 60 |
| truck bed support | 66 |
| truck bed support front | 68 |
| truck bed support rear | 70 |
| truck bed support length | 72 |
| truck bed support left side | 74 |
| truck bed support right side | 76 |
| truck bed support width | 78 |
| truck bed support front bar | 80 |
| truck bed support rear bar | 82 |
| truck bed support first middle bar | 84 |
| truck bed support left side bar | 86 |
| truck bed support left side bar front | 88 |
| truck bed support left side bar middle | 90 |
| truck bed support left side bar rear | 92 |
| truck bed support left side bar length | 93 |
| truck bed support right side bar | 94 |
| truck bed support right side bar front | 96 |
| truck bed support right side bar middle | 98 |
| truck bed support right side bar rear | 100 |
| truck bed support right side bar length | 101 |
| tongue frame | 102 |
| tongue frame front bar | 104 |
| Top horizontal bar | 105 |
| tongue frame left bar | 106 |
| Bottom horizontal bar | 107 |
| tongue frame right bar | 108 |
| Top horizontal bar hole | 109 |
| truck bed support second middle bar | 110 |
| Bottom horizontal bar hole | 111 |
| runner | 112 |
| Wheel | 114 |
| Bolt holes | 116 |

Figure 7:
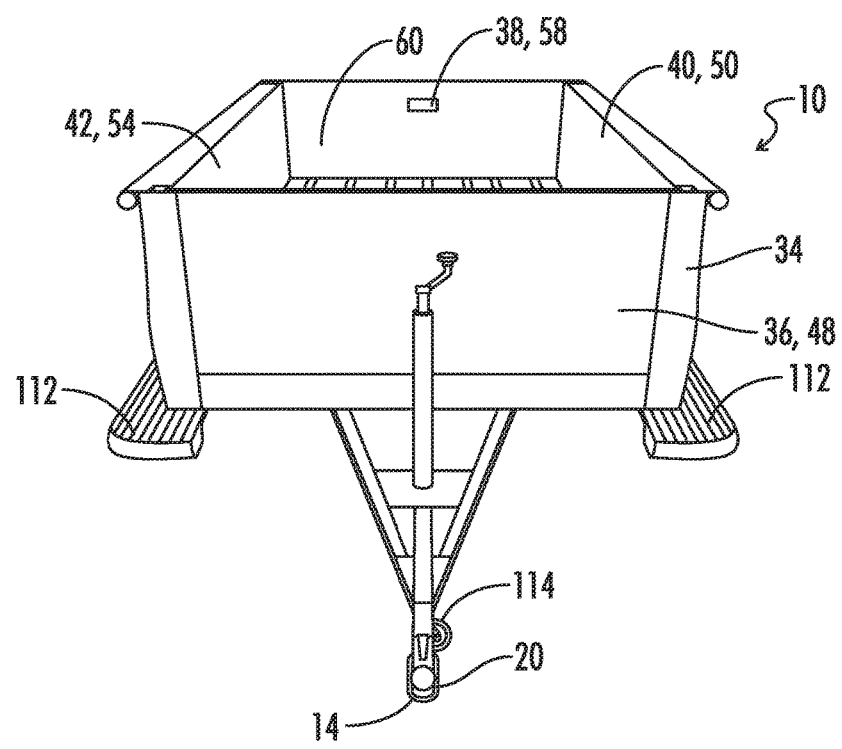
FIG. 7 illustrates a front perspective view of the truck bed trailer of FIG. 6.
Figure 8:
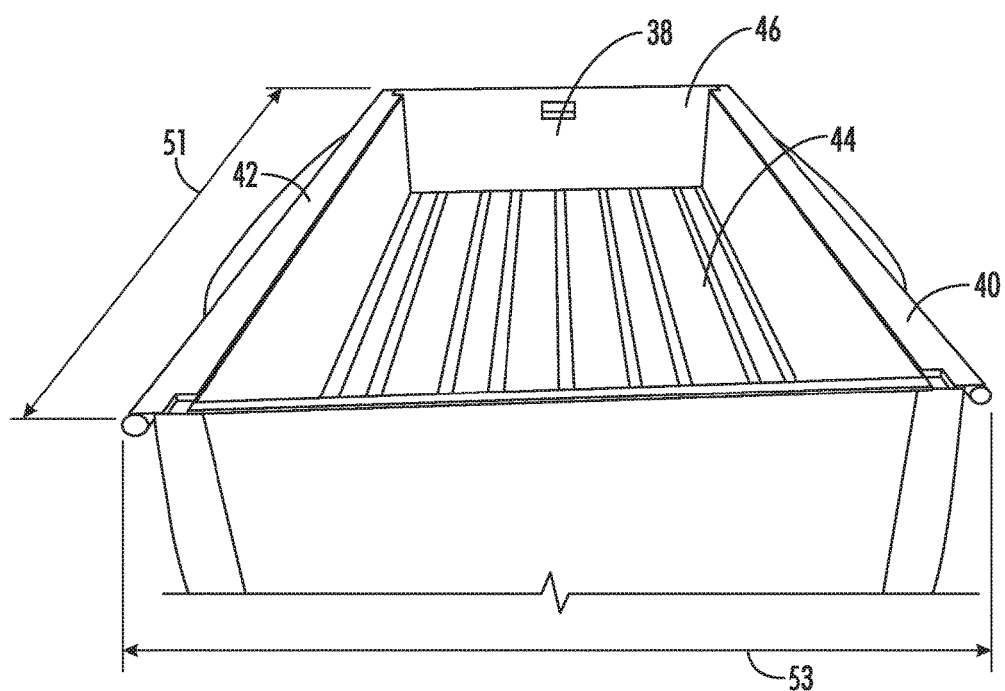
FIG. 8 illustrates a top perspective view of the truck bed trailer of FIG. 6.

It will be understood that the dimensions provided in FIGS. 2-5 (all in inches) are exemplary and, in preferred embodiments, the dimensions may vary by about 10%, more preferably less than about 5%, more preferably less than about 2%. One or more of the bars described herein may be U-shaped. The tongue frame 102 may be supported by a center wheel as shown in FIG. 7.

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A truck bed trailer comprising:
a trailer frame comprising a trailer frame front end, a trailer frame rear end, a trailer frame length extending from the trailer frame front end to the trailer frame rear end, a trailer coupler configured to attach to a hitch of a vehicle and located adjacent to the trailer frame front end, a trailer frame left side comprising a left wheel comprising a left wheel axle, a trailer frame right side comprising a right wheel comprising a right wheel axle, and a trailer frame width extending from the trailer frame left side to the trailer frame right side and generally perpendicular to the trailer frame length;
a truck bed comprising a truck bed front, a truck bed rear, a truck bed left side, a truck bed right side, a truck bed floor attached to the trailer frame, the truck bed floor comprising a truck bed floor surface area, a truck bed open top opposite the truck bed floor, a truck bed front wall extending from the floor and forming the truck bed front, a truck bed left sidewall generally perpendicular to the truck bed front wall and extending upwardly from the truck bed floor, the truck bed left sidewall forming the truck bed left side and comprising a left wheel well receiving the left wheel, a truck bed right sidewall generally perpendicular to the truck bed front wall, extending upwardly from the truck bed floor and opposite the truck bed left sidewall, the truck bed right sidewall forming the truck bed right side and comprising a right wheel well receiving the right wheel, and a truck bed rear wall opposite the truck bed front wall and forming the truck bed rear, the truck bed floor, the truck bed front wall, the truck bed rear wall, and the truck bed left and right sidewalls defining a truck bed chamber configured to transport cargo,
wherein about 60% of the surface area of the truck bed floor is located in front of the right axle and in front of the left axle and further wherein about 40% of the surface area of the truck bed floor is located to the rear of the right axle and the left axle,
a truck bed support located below the truck bed floor and generally rectangular in shape and comprising a truck bed support front, a truck bed support rear, a truck bed support length extending from the truck bed support front to the truck bed support rear and generally parallel to the truck bed length, a truck bed support left side, a truck bed support right side, a truck bed support width extending from the truck bed support left side to the truck bed support right side and generally parallel to the truck bed width, a truck bed support front bar forming the truck bed support front and generally parallel to the truck bed width, a truck bed support rear bar forming the truck bed support rear and generally parallel to the truck bed width, a truck bed support first middle bar located between the truck bed support front bar and the truck bed support rear bar and extending generally parallel to the truck bed width, a truck bed support left side bar forming the truck bed support left side and comprising a truck bed support left side bar front end attached to the truck bed support front bar, a truck bed support left side bar middle portion attached to the truck bed support first middle bar, a truck bed support left side bar rear end attached to the truck bed support rear bar and a truck bed support left side bar length extending from the truck bed support left side bar front end to the truck bed support left side bar rear end and generally parallel to the truck bed support length, and a truck bed support right side bar forming the truck bed support right side and comprising a truck bed support right side bar front end attached to the truck bed support front bar, a truck bed support right side bar middle portion attached to the truck bed support first middle bar, a truck bed support right side bar rear end attached to the truck bed support rear bar and a truck bed support right side bar length extending from the truck bed support right side bar front end to the truck bed support right side bar rear end and generally parallel to the truck bed support length; and
a tongue frame comprising a tongue frame front bar comprising the trailer coupler, a tongue frame left bar extending at a non-perpendicular angle from the tongue frame front bar, the tongue frame left bar extending below and attaching to the truck bed support front bar and extending below and attached to the truck bed support first middle bar and the truck bed support left side bar, a tongue frame right bar extending at a non-perpendicular angle from the tongue frame front bar, the tongue frame right bar extending below and attaching to the truck bed support front bar and extending below and attached to the truck bed support right side bar.

2. The truck bed trailer of claim 1, wherein approximately 60% of the truck bed length is located in front of the right axle and the left axle and further wherein approximately 40% of the truck bed length is located to the rear of the right axle and the left axle.

3. The truck bed trailer of claim 1, wherein the truck bed floor is bolted to the trailer frame.

4. The truck bed trailer of claim 1, wherein the truck bed rear wall is in the form of a tailgate configured to pivot along an axis generally parallel to the rear wall.

5. The truck bed trailer of claim 1, wherein the truck bed lacks a gas cap.

6. The truck bed trailer of claim 1, wherein the truck bed trailer further comprises electric brakes coupled to the left wheel and the right wheel.

7. The truck bed trailer of claim 1, wherein the left wheel and the right wheel are configured to support at least 2,200 pounds.

8. The truck bed trailer of claim 1, wherein the truck bed floor is bolted to the truck bed support.

9. The truck bed trailer of claim 1 wherein the tongue frame right bar, the tongue frame left bar, and the truck bed support first middle bar form a triangle.

10. The truck bed trailer of claim 9 wherein the angle at which the tongue frame left bar extends from the tongue frame front bar is approximately equal to the angle at which the tongue frame right bar extends from the tongue frame front bar and further wherein the triangle is an isometric triangle.

11. The truck bed trailer of claim 1 wherein the truck bed support further comprises a truck bed support second middle bar located extending between the truck bed support left side bar and the truck bed support right side bar generally parallel to the truck bed width.

12. The truck bed trailer of claim 1, wherein the tongue frame front bar extends towards but does not contact the truck bed support front bar.

13. The truck bed trailer of claim 1 wherein the truck bed comprises at least one runner extending along the truck bed length.

\* \* \* \* \*